United States Patent

Derderian et al.

[11] 3,972,757
[45] *Aug. 3, 1976

[54] MANUFACTURE OF VULCANIZED ELASTOMERIC HOSE

[75] Inventors: Carl Derderian, Cheshire; Robert Miller, Woodbridge, both of Conn.

[73] Assignee: Uniroyal, Inc., New York, N.Y.

[ * ] Notice: The portion of the term of this patent subsequent to July 16, 1991, has been disclaimed.

[22] Filed: Sept. 16, 1974

[21] Appl. No.: 506,660

[52] U.S. Cl. .............................. 156/143; 156/287; 156/311; 264/347
[51] Int. Cl.² ........................................ B29C 25/00
[58] Field of Search .......... 156/143, 149, 156, 173, 156/287, 311, 393; 264/347, 103, 201, 209; 23/290

[56] References Cited
UNITED STATES PATENTS

| | | | |
|---|---|---|---|
| 408,376 | 8/1889 | Cobb | 264/347 |
| 1,730,639 | 10/1929 | Blaker | 264/347 |
| 2,513,106 | 6/1950 | Prendergast | 156/143 |
| 3,684,602 | 8/1972 | Ball | 156/149 |
| 3,776,794 | 12/1973 | Ingham | 156/143 |
| 3,824,141 | 7/1974 | Miller et al. | 156/143 |

Primary Examiner—Douglas J. Drummond
Assistant Examiner—John E. Kittle
Attorney, Agent, or Firm—Norbert P. Holler

[57] ABSTRACT

A batch process for vulcanizing, without the use of a lead press, reinforced elastomeric hose built up on a solid mandrel, preferably a flexible mandrel of rubber or thermoplastic material, is disclosed. In the preferred embodiment of the process, the uncured hose is first annularly tightly clamped at its opposite ends and is then immersed in a bath of liquid, e.g. water, sufficient to cover the hose substantially completely. The entire assembly is then subjected in a pressurized heating environment, e.g. in a steam-filled vulcanizer or autoclave, to the action of fluid pressure against the outer hose surface and the pressure due to the thermal expansion of the mandrel against the inner hose surface. The clamping of the hose ends prevents entry of fluid pressure into the space between any two proximate layers of elastomeric material occupied by a layer of the filamentary reinforcement. The heating operation is continued until the elastomeric material is vulcanized and is forced into the interstices of the reinforcement, so as to achieve good adhesion between the latter and the elastomeric material in the ultimate molded hose. This abstract is not to be taken as a complete exposition or as a limitation of the present invention, however, the full nature and extent of the invention being discernible only by reference to and from the entire disclosure.

10 Claims, 10 Drawing Figures

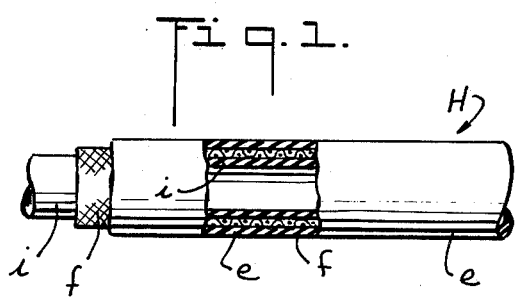
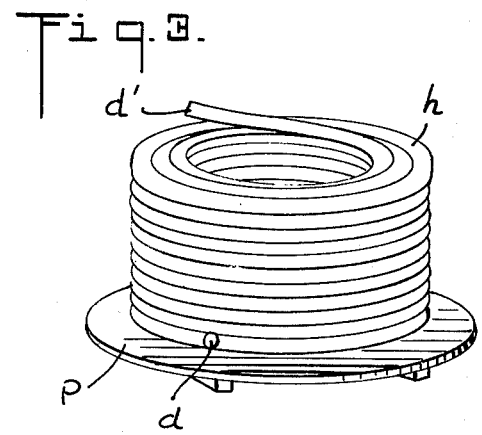
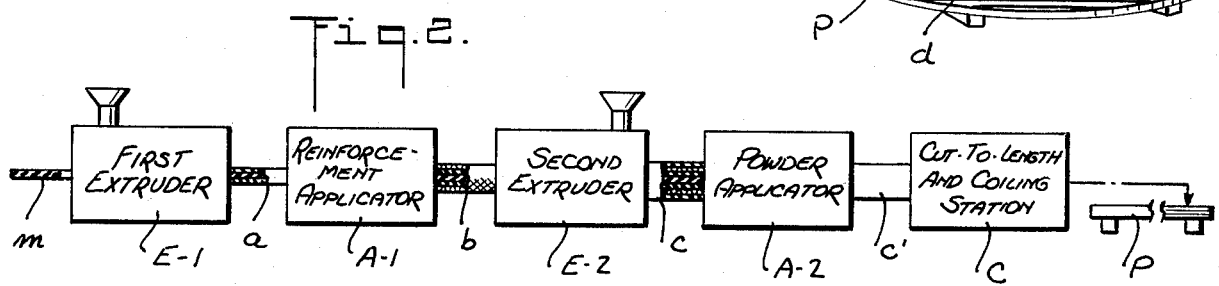
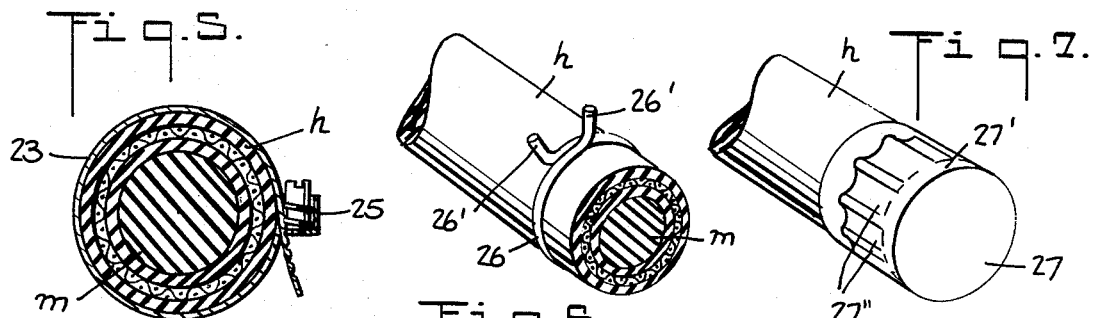
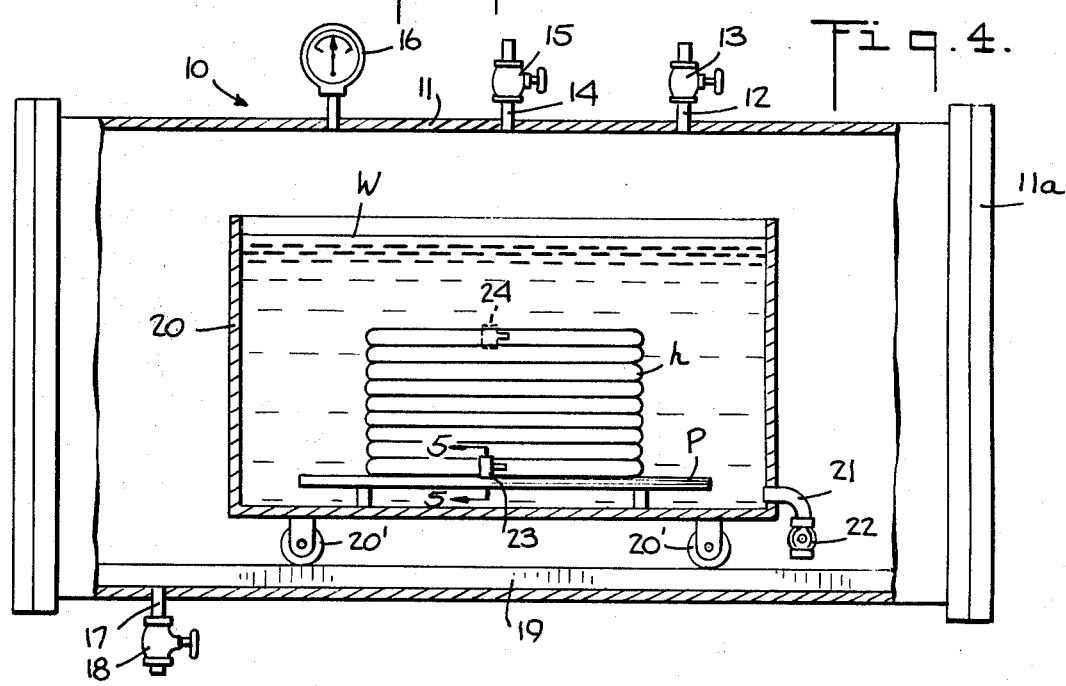

MANUFACTURE OF VULCANIZED ELASTOMERIC HOSE

This invention relates to the art of manufacturing vulcanized reinforced elastomeric hose.

Batch processes of manufacturing vulcanized textile- and wire-reinforced elastomeric hose, such as garden hose, automotive heater and power steering hose, and the like, in relatively short finite lengths are known. One such process is disclosed in U.S. Pat. No. 3,824,141. In that process, a curable elastomeric compound is first extruded in tubular form. A reinforcing sleeve or layer structure of metallic or non-metallic filamentary material is then built up on or otherwise applied to the exterior of the extruded tube of elastomer while the same is internally pressurized to prevent collapse, and the resultant composite is then passed through a suitable extruder by means of which an outer covering of curable elastomeric compound is applied over the reinforcing structure. For some types of hose intended for use at higher pressures, one or more additional layers of filamentary reinforcement material, which may or may not be separated from the first reinforcement structure or from one another by an interposed layer of elastomeric material, may be incorporated in the hose before the application of the said outer covering. The length of uncured hose to be vulcanized is then first annularly clamped at each of its opposite ends and thereafter, while either filled with liquid or not, is immersed in a bath of liquid and disposed in a pressurized heating environment such as a steam-filled vulcanizer or autoclave so as to be subjected at both its inner and outer surfaces to the direct action of fluid pressure at the desired vulcanizing temperature. By virtue of the annular clamping of the hose ends, any entry of fluid pressure into the space between any two proximate layers of elastomeric material occupied by a layer of reinforcement is effectively inhibited. As a result, the opposing pressures directed interiorly of the hose wall and exerted by the heating fluid against the inner and outer hose surfaces are greater initially than any back or counter pressure directed exteriorly of the hose wall and exerted by such air or other vapors as may be trapped between the elastomeric layers. The elastomeric material will, therefore, be pressed against and forced into the interstices of the reinforcement so as to effect a proper knitting of the reinforcement to the elastomeric material in the vulcanized hose.

The batch process of U.S. Pat. No. 3,824,141, although having the advantages there stated, is nevertheless almost unavoidably characterized by the fact, resulting from the requirement for an application of fluid pressure to both the inside and the outside surfaces of the uncured hose, that a precise control of the cross-sectional shape and dimensions of the cured hose is not attainable. For some types of applications, of course, a certain degree of "out of round" of the hose cross-section can be tolerated, but for other applications the avoidance of an out of round cross-section becomes highly desirable or even essential.

It is an important object of the present invention, therefore, to provide a refinement and improvement of the batch process of manufacturing vulcanized reinforced elastomeric hose described in the aforesaid patent, so as to enable such hose to be produced with as good a round cross-section as feasible.

Generally speaking, the objectives of the present invention are attained by a process in which the length of uncured hose to be vulcanized is built up on a solid mandrel, preferably a flexible mandrel made of rubber or of a suitable thermoplastic material such as nylon, or of a combination of such materials, and capable of withstanding the vulcanizing temperatures to be encountered. The hose is then, before being immersed in the bath of liquid, clamped at its opposite ends as more fully described hereinafter, so that during the subsequent heating operation any entry of fluid pressure into the space between any two proximate layers of elastomeric material occupied by a layer of reinforcement is effectively inhibited. When the mandrel-containing hose is then introduced into the pressurized thermal environment, the mandrel also expands somewhat, depending on its coefficient of thermal expansion. The hose wall thus is subjected to opposing interiorly directed pressures exerted by the surrounding heating fluid and the expanding mandrel, which cooperate to counteract any exteriorly directed pressure generated within the hose wall by such air or other vapors as may be trapped between the elastomeric layers. This ensures that the elastomeric material will be properly pressed against and forced into the interstices of the reinforcement so as to achieve the required good adhesion between the reinforcement and the elastomeric material in the ultimate vulcanized hose.

For the purposes of the present invention, the mandrel will extend through the hose along at least almost the entire length of the hose. Thus, the mandrel may extend fully over the entire length of the hose, in which case it may also project somewhat beyond the hose ends, or the mandrel may be somewhat shorter than the hose, in which case relatively short-length end sections of the hose will be unsupported. Where a full-length mandrel is used, the fluid pressure entry-inhibiting clamping of each of the hose ends will be effected in an annular fashion between the mandrel and any suitable encircling clamping element, for example a metallic strap having screw-operated tightening means and generally known as an "airplane type" clamp. As possible alternatives, a device such as a spreadable spring-type hose clamp or the like, or a metal end cap capable of being fitted over the hose end region on the mandrel and having a skirt capable of being crimped into the outermost layer of the hose, may be used. Where a short-length mandrel is used, on the other hand, each of the hose ends may again be clamped annularly, in this case between an encircling clamping element as aforesaid and an either solid or tubular plug-like member inserted into the unsupported hose end region. Alternatively, each such unsupported hose end region may be clamped flat by means of any suitable device providing a pair of opposed clamping elements, for example such as a C-clamp, an umbilical type clamp, etc., engaging the hose externally. A wire tie or the like could also be used. Whether the mandrel is of full length or not, however, if the clamping devices used are such as to leave the ends of the mandrel exposed, it is further preferred, if the mandrel is made of a thermoplastic material, to coat the exposed ends of the mandrel with a suitable cement or comparable covering material to prevent degradation of the thermoplastic material by the heated liquid or steam.

The foregoing and other objects, characteristics and advantages of the present invention will be more clearly understood from the following detailed description thereof when read in conjunction with the accompanying drawings, in which:

FIG. 1 is a fragmentary plan view, partly broken away and partly in section, of one type cured reinforced elastomeric hose of conventional construction;

FIG. 2 is a block diagram illustrating schematically the manner of forming uncured hose to be vulcanized;

FIG. 3 is a perspective schematic illustration of a mandrel-containing uncured hose as deposited in a coiled state on a pallet or like support at the end of the hose forming process illustrated in FIG. 2;

FIG. 4 is a side elevational view, partly broken away and partly in section, of an apparatus for vulcanizing uncured hose in a batch process, the process in this embodiment of the present invention being illustrated as utilizing a full-length mandrel;

FIG. 5 is a greatly enlarged sectional view taken along the line 5—5 in FIG. 4 and illustrates one type of clamping device which may be used in the practice of the process;

FIGS. 6 and 7 are fragmentary perspective views of one end region of a hose and full-length mandrel combination and illustrate the use of somewhat modified clamping devices.

Figure 8:
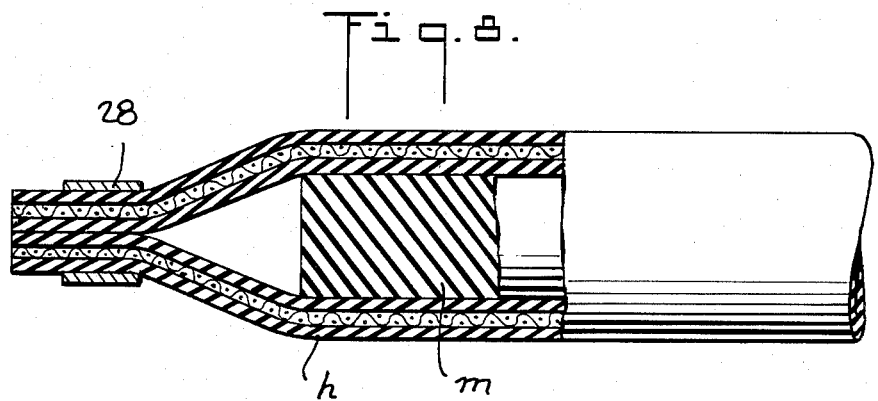
FIGS. 8, 9 and 10 are fragmentary longitudinal sectional views of one end region of a hose and a less than full-length mandrel therein and illustrate, respectively, somewhat modified clamping arrangements therefor.

Referring now first to FIG. 1, the type of hose H to the production of which the present invention pertains is of generally conventional construction, including in its simplest form interior and exterior tubular layers $i$ and $e$ of elastomeric material, and an intermediate tubular layer $f$ of filamentary reinforcing material. In some constructions, of course, as those skilled in the art will understand, the tubular layer $f$ may be a multilayer arrangement, and any two such layers may or may not be separated by an intermediate layer of elastomeric material. The elastomeric material may be any of those normally used in hose manufacture, for example natural rubber, a synthetic rubber such as SBR (styrene butadiene rubbber), neoprene, EPDM (ethylene propylene diene monomer rubber), EPR (ethylene propylene copolymer rubber), butyl rubber, cis-polybutadiene, cis-polyisoprene, polyurethane, and the like, a blend of natural and synthetic rubbers, a vlucanizable blend of rubbers and resins such as vinyl resin-nitrile rubber blends, etc. The filamentary reinforcement may be constructed of metallic filaments or strands, e.g. steel wire, or of non-metallic filaments or stands of natural or synthetic fibers, e.g. cotton, glass fiber, rayon, nylon, aramid, polypropylene, polyester, and the like, or blends of the same, and the reinforcement may be of a braid, spiral, knit or woven construction. If desired or necessary, the filaments or strands of the reinforcement may be pretreated with a suitable material, e.g. a resorcinolformaldehyde latex (RFL), to enhance their adhesion to the elastomeric material.

The manner of forming an uncured hose $h$ of the aforesaid simplest construction is generally shown in FIG. 2. In the illustrated embodiment, a solid but flexible mandrel $m$, formed in any suitable way (not shown), for example by extrusion techniques well known to those skilled in the art, of rubber, nylon (or a similar thermoplastic material), or combinations thereof, and either with or without an internal reinforcement of wire or textile filaments, is initially fed from a source thereof (not shown) through a first cross-head extruder E-1 where an uncured elastomeric compound of any suitable composition (normally one chosen from those identified hereinbefore in the light of the physical properties to be imparted to the hose for use in its intended environment) is extruded in sleeve or tubular form onto the mandrel. The mandrel-containing tube $a$ so formed is fed through a reinforcement applicator A-1 where the filamentary reinforcement is applied to the exterior of the tube $a$ to produce a composite two-layer tube $b$ on the mandrel. The entire combination is then fed through a second cross-head extruder E-2 where a covering or outer layer of elastomeric compound is applied to the exterior of the composite tube $b$ to produce a three-layer composite tube $c$ on the mandrel. From the extruder E-2 the mandrel-containing tube $c$ is passed through a powder applicator A-2 where a suitable antistick powder, such as mica, talc or the like, is applied to the outer surface of the tube $c$. The dusted tube $c'$ is then fed to a final station C where, if necessary or desired, it may be cut to the desired length and is deposited as the mandrel-containing uncured hose $h$ in coiled form on a pallet P or like support (see also FIG. 3).

Referring now to FIG. 4, the apparatus 10 for vulcanizing the hose $h$ includes an autoclave or vulcanizer 11 provided (elements normally found in such autoclaves but not pertinent here have been omitted for the sake of simplicity) with a boltable front end door or closure 11a, a steam inlet port 12 controlled by a valve 13, a venting port 14 controlled by a valve 15, a pressure gauge 16, and a liquid drain port 17 controlled by a valve 18. Arranged on the floor of the autoclave 11 are two rails 19 (only one is shown) defining a track for an immersion vessel or tub 20 mounted on wheels 20'. It will be apparent that the tub itself need not be wheeled but could be supported on a separate wheeled truck (not shown). The tub 20 is provided near the bottom thereof with a drain port 21 controlled by a valve 22.

In vulcanizing an uncured hose $h$ by the process of the present invention, the pallet P and the length of mandrel-containing hose supported thereon (the hose is shown as coiled but it may be otherwise laid down, if desired) are placed into the tub 20, with the hose ends $d$ and $d'$ (FIG. 3) annularly clamped between the mandrel $m$ and a pair of clamping devices 23 and 24, respectively. In the form illustrated in FIGS. 4 and 5, each clamping device is an airplane-type hose clamp including a band or strap of metal extending for somewhat more than one full turn about the hose and having adjustable tightening means 25, shown schematically as a screw and worm combination, associated therewith for drawing the band tight about the hose. As previously mentioned, however, the clamping device can take other forms as well. In the form illustrated in FIG. 6, the clamping action is effected by spring-type hose clamp 26 normally biased closed and having a pair of projecting ends 26' which can be gripped by the fingers and pressed together to open the clamp for fitting it onto a hose. In the form illustrated in FIG. 7, the clamping action is effected by an end cap 27 having its peripheral skirt 27' fitted over the hose end region and crimped thereto, as shown at 27''.

Reverting now to the process, with the valve 22 closed, the tub 20 is filled with enough water W (water is preferred but other liquids such as glycols and the like having a boiling point at least as high as water can also be used) to cover the end-clamped uncured hose $h$ entirely (FIG. 4) and is then shifted fully into the autoclave 11. The door 11a thereof is now bolted shut, and, with the valves 15 and 18 closed and the valve 13 open, live steam is admitted into the autoclave via the port 12 to raise the temperature and pressure within the autoclave to the desired vulcanizing temperature and pressure. The precise temperature and pressure selected will, of course, depend on the cure requirements of the various herein mentioned elastomeric compounds. Merely by way of example, it is contemplated that normally the vulcanizing temperature will be on the order of about 316°F, corresponding to a steam pressure of about 70 psi, but obviously higher or lower temperatures and/or pressures can be used if conditions warrant.

As the temperature in the vulcanizer rises and the water W in the tub 20 becomes warmer (here it might be noted that steam, in addition to being admitted into the ambient space of the autoclave, can also be blown by a separate pipe, not shown, directly into and through the water in the tub to increase the rate of heating of that water, and that the pallet P may be perforated, not shown, to provide for increased water circulation and contact with the hose), the mandrel confined within the uncured hose h is also heated and expands. The pressure exerted by the mandrel on the inner surface of the hose thus opposes that existing in the autoclave and exerted by the steam on the water W and thereby on the outer surface of the hose, so that the elastomeric material is forced by the opposed pressures into the interstices of the reinforcement to effect the desired good adhesion between the elastomeric material and the reinforcement.

The cure cycle, which from a practical standpoint is taken as beginning when the water in the tub 20 has been heated to the vulcanizing temperature, is continued for a time interval sufficient to ensure the substantially full cure of the elastomeric material. In general, a cure cycle on the order of about 45 minutes is found adequate, although the cycle may be longer or shorter depending on the cure requirements of the elastomeric material used. At the end of the cure cycle, the valve 13 is closed to discontinue the admission of steam into the autoclave, and the valve 15 is opened to vent the autoclave and permit both the pressure and the temperature within the autoclave to drop relatively slowly. The cooling period is continued until the ambient temperature in the autoclave drops to less than 200°F and preferably until the temperature is about 150°F. If desired, the rate of cooling of the ambient atmosphere in the autoclave may be accelerated somewhat through the use of a water spray. At the end of the cooling period, the valve 18 is opened to drain accumulated condensate from the autoclave. Thereupon, the autoclave door 11a is opened, the valve 22 is opened to drain the water from the tub (although this may optionally be omitted), and the tub is removed from the autoclave. The pallet P is then lifted out of the tub for transfer to the final hose processing station at which the mandrel is extracted and the hose is passed through a cleaning device and, if desired, is marked with suitable identifying indicia, e.g. number codes and the like, applied to its exterior surface.

Figure 9:
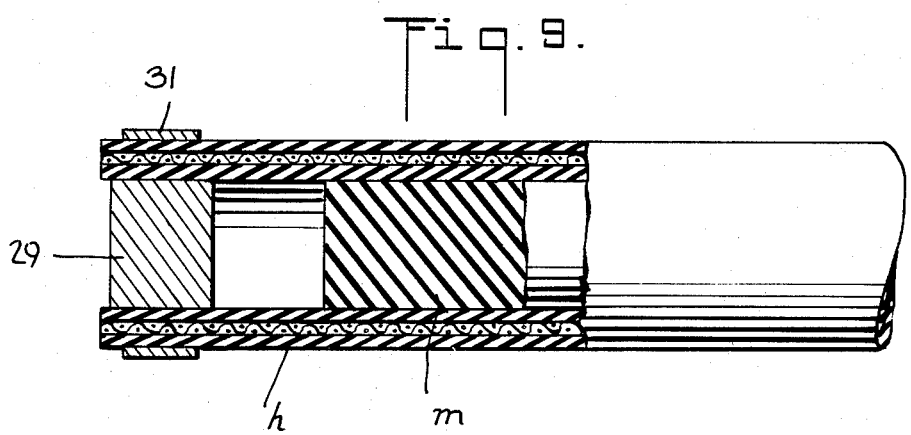
Figure 10:
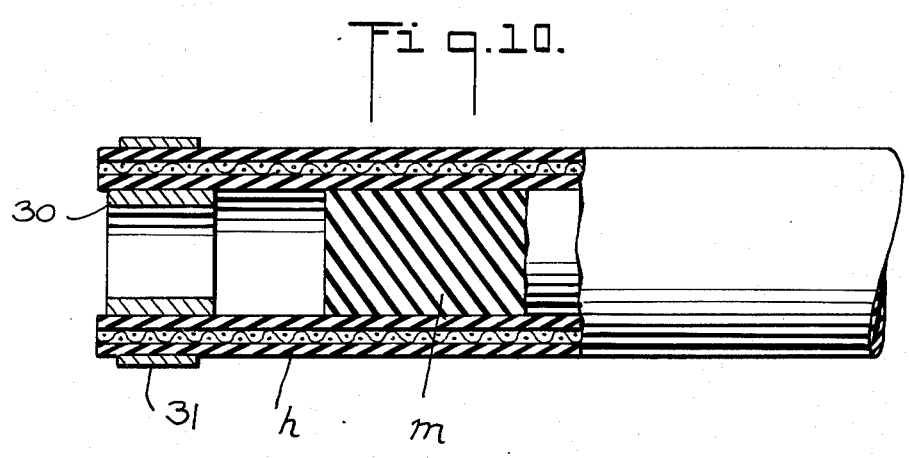

As previously mentioned, the solid mandrel m may be somewhat shorter than the hose h. In such a case, as shown in FIG. 8, each unsupported end region of the hose may be clamped flat by a device 28 having a pair of opposed clamping elements, for example an umbilical type clamp, a C-clamp, etc., engaging the uncured hose externally. Alternatively, a part of each unsupported hose end region may be annularly clamped, for example between either a short imperforate plug 29 (FIG. 9) or a tubular plug 30 (FIG. 10) inserted into the end region of the hose and an associated external clamping element 31 which may be any of those designated 23, 26 and 27 in FIGS. 5, 6 and 7.

It will be noted that the efficacy of the hose curing method according to the present invention in leading to the attainment of optimum adhesion between the elastomeric material and the reinforcement is a direct function of the clamping of the ends of the hose in such a manner that the fluid pressure in the vulcanizer cannot leak or wick in between proximate layers of elastomeric material along an intermediate layer of filamentary reinforcement material. The significance of this feature is that if such leakage of pressure were not inhibited, it would not be feasible, for reasons which will be clear to those skilled in the art, to ensure that the pressures acting on the inner and outer hose surfaces are sufficiently greater than the pressure at the location of the reinforcement to enable the elastomeric material to be forced as much as possible into the interstices of the reinforcement material.

It will be apparent that although the herein described hose curing method is a batch process, it is not limited to use with extremely short lengths of hose. In actual practice, depending on the hose construction, the intended hose diameter and the size of the mandrel (which determine how compactly the hose can be arranged and disposed in the autoclave), hose lengths of as much as 2,000 feet can be cured by the methods of this invention. Such hose is also found to compare favorably in quality and appearance with the best hose vulcanized by the lead press method, but due to the elimination of the lead press, it has become possible to produce the hose with far less scrap losses and at considerably lower overall manufacturing costs.

It will further be understood that the foregoing description of various embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. In the method of producing vulcanized reinforced elastomeric hose having a body construction characterized by a plurality of tubular layers of elastomeric material and at least one layer of filamentary reinforcement material between each proximate pair of layers of elastomeric material; the improvement comprising the steps of:

a. providing an uncured hose having the aforesaid body construction on a solid mandrel extending through said uncured hose along at least almost the entire length of the latter;

b. tightly clamping said uncured hose at each of its opposite end regions by means of a respective clamping device engaging at least the outer surface of said uncured hose for inhibiting any entry of fluid pressure into the space between such proximate layers of elastomeric material along an intermediate layer of reinforcement material, said uncured hose over the entire expanse of said outer surface thereof except at the clamped ends being free of any closely juxtaposed solid confinement structure;
c. immersing said uncured hose in a bath of liquid sufficient to cover said uncured hose substantially completely;
d. while said uncured hose remains immersed in said bath of liquid, subjecting said hose in a pressurized thermal environment to the direct action of fluid pressure against the outer hose surface, so that said pressure and the thermal expansion of said mandrel act on the outer and inner hose surfaces, respectively; and
e. maintaining said uncured hose in said pressurized thermal environment for a period of time sufficient to effect the vulcanization of said elastomeric material and the penetration thereof into said reinforcement material.

2. The method of claim 1, wherein said mandrel is flexible and composed of rubber or thermoplastic material or a combination thereof and has the capacity to resist the vulcanization temperatures applied to said uncured hose in said thermal environment.

3. The method of claim 2, wherein said uncured hose is disposed in a coiled configuration while subjected to said thermal environment.

4. The method of claim 1, wherein said liquid is water.

5. The method of claim 1, wherein said pressurized thermal environment is established in an autoclave or vulcanizer by admission into the latter of a pressurized fluid heating medium.

6. The method of claim 5, wherein said pressurized fluid heating medium is saturated steam.

7. The method of claim 6, wherein said liquid is water.

8. The method of claim 1, wherein said mandrel is at least as long as said uncured hose, and each of said end regions of said uncured hose is annularly clamped between said mandrel and a respective externally encircling clamping element.

9. The method of claim 1, wherein said mandrel is shorter than said uncured hose, and each of said end regions of said uncured hose which is unsupported by said mandrel is annularly clamped between a plug-like member inserted into that end region and a respective externally encircling clamping element.

10. The method of claim 1, wherein said mandrel is shorter than said uncured hose, and each of said end regions of said uncured hose which is unsupported by said mandrel is clamped flat between a pair of opposed external clamping elements.

* * * * *